US007412053B1

(12) United States Patent
Lyle (10) Patent No.: US 7,412,053 B1
(45) Date of Patent: Aug. 12, 2008

(54) CRYPTOGRAPHIC DEVICE WITH STORED KEY DATA AND METHOD FOR USING STORED KEY DATA TO PERFORM AN AUTHENTICATION EXCHANGE OR SELF TEST

(75) Inventor: James D. Lyle, Santa Clara, CA (US)

(73) Assignee: Silicon Image, Inc., Sunnyvale, CA (US)

( * ) Notice: Subject to any disclaimer, the term of this patent is extended or adjusted under 35 U.S.C. 154(b) by 847 days.

(21) Appl. No.: 10/268,832

(22) Filed: Oct. 10, 2002

(51) Int. Cl.
 *H04L 9/00* (2006.01)
(52) U.S. Cl. .................... 380/2; 380/277; 713/168; 324/765; 714/30; 714/724
(58) Field of Classification Search ............. 380/2
 See application file for complete search history.

(56) References Cited

U.S. PATENT DOCUMENTS

| 5,247,577 | A  | * | 9/1993 | Bailey et al. ............ 713/191 |
| 5,631,960 | A  | * | 5/1997 | Likens et al. ............... 380/2 |
| 5,925,144 | A  | * | 7/1999 | Sebaa ..................... 714/733 |
| 6,101,254 | A  | * | 8/2000 | Thiriet ..................... 380/2 |
| 6,324,288 | B1 | * | 11/2001 | Hoffman ................. 380/249 |
| 6,401,208 | B2 | * | 6/2002 | Davis et al. ............. 713/193 |
| 6,430,705 | B1 | * | 8/2002 | Wisor et al. ............... 714/30 |
| 6,664,803 | B2 | * | 12/2003 | Goodman ................. 326/8 |
| 6,985,581 | B1 | * | 1/2006 | Callum ..................... 380/2 |
| 7,088,398 | B1 | * | 8/2006 | Wolf et al. .............. 348/423.1 |

OTHER PUBLICATIONS

Easter et al., "S/390 Parallel Enterprise Server CMOS Cryptographic Coprocessor", IBM Journal of Research & Development, Sep. 1999, Retrieved from the Internet on May 12, 2006: <URL: http://www.research.ibm.com/journal/rd/435/easter.pdf>.*
Grochowski et al., "Integrated Circuit Testing for Quality Assurance in Manufacturing: History, Current Status, and Future Trends", IEEE, Aug. 1997, Retrieved from the Internet on May 12, 2006: <URL: http://ieeexplore.ieee.org/iel4/82/13459/00618036.pdf?tp=&arnumber=618036&isnumber=13459>.*
Grossman, "Two-Chip Set Safeguards Digital", Electronic Design, Jun. 2000, Retrieved from the Internet on May 12, 2006: <http://proquest.umi.com/pqdweb?index=0&did=55247611&SrchMode=1&sid=1&Fmt=6&VInst=PROD&VType=PQD&RQT=309&VName=PQD&TS=1148765197&clientId=19649>.*
Nagle et al., "Design for Testability and Built-In Self Test: A Review", IEEE, May 1989, Retrieved from the Internet on May 12, 2006: <URL: http://ieeexplore.ieee.org/iel1/41/723/00019062.pdf?tp=&arnumber=19062&isnumber=723>.*
"High-bandwidth Digital Content Protection—White Paper", Silicon Image, Feb. 2000, Retrieved from the Internet on May 12, 2006: <URLhttp://www.siimage.com/docs/Sil-WP-002-A.pdf>.*
Hafner et al., "Design and Test of an Integrated Cryptochip", IEEE, 1991, Retrieved from the Internet on Sep. 24, 2007: <URL: http://ieeexplore.ieee.org/iel1/54/3270/00107201.pdf?arnumber=107201>.*
Schwair et al., Complete Self-test Architecture for a Coprocessor, International Test Conference, 1990, Retrieved from the Internet on Feb. 2, 2008: <URL: http://ieeexplore.ieee.org/iel5/485/3370/00114107.pdf?tp=&arnumber=114107&isnumber=3370>.*
*High-Bandwidth Digital Content Protection System*, Revision 1.0, by Intel Corporation, Feb. 17, 2000, pp. 1-60.
*High-Bandwidth Digital Content Protection System Revision 1.0 Erratum*, by Intel Corporation, Mar. 19, 2001, pp. 1-9.
HDMI Founders Hitachi, Matsushita (Panasonic), Philips, Silicon Image, Sony, Thomson and Toshiba Complete v 0.9 High Definition Multimedia Interface Draft Specification, Press Release, Sunnyvale, Calif., Jun. 28, 2002, 2 pages, downloaded from the Internet (from http://www.hdmi.org/press/release_062402.asp) on Sep. 25, 2002.

* cited by examiner

*Primary Examiner*—Gilberto Barron, Jr.
*Assistant Examiner*—Minh Dinh
(74) *Attorney, Agent, or Firm*—Girard & Equite LLP (57) ABSTRACT

In preferred embodiments, a cryptographic device in which two key sets are stored: a normal key set (typically unique to the device) and a test key set (typically used by each of a relatively large number of devices). The device uses the normal key set in a normal operating mode and uses the test key set in at least one test mode which can be a built-in self test mode. Alternatively, the device stores test data (e.g., an intermediate result of an authentication exchange) in addition to or instead of the test key set. In other embodiments, the invention is a cryptographic device including a cache memory which caches a portion of a key set for performing an authentication exchange and/or at least one authentication value generated during an authentication exchange. Other embodiments of the invention are systems including devices that embody the invention and methods that can be performed by systems or devices that embody the invention.

8 Claims, 7 Drawing Sheets

CRYPTOGRAPHIC DEVICE WITH STORED KEY DATA AND METHOD FOR USING STORED KEY DATA TO PERFORM AN AUTHENTICATION EXCHANGE OR SELF TEST

TECHNICAL FIELD OF THE INVENTION

The invention pertains to methods and systems for encrypting data for transmission (e.g., over a serial link) and decrypting transmitted data, and to transmitters and receivers for use in such systems. More particularly, the invention pertains to storing test key data in a cryptographic device for use in test mode operation, and to caching part of a key set for use in performing an authentication exchange and/or at least one authentication value that would otherwise need to be generated (using at least one key of a key set) during an authentication exchange.

BACKGROUND OF THE INVENTION

Various serial links for transmitting encrypted or non-encrypted data are well known. One conventional serial link, used primarily in consumer electronics (e.g., for high-speed transmission of video data from a set-top box to a television set) or for high-speed transmission of video data from a host processor (e.g., a personal computer) to a monitor, is known as a transition minimized differential signaling interface ("TMDS" link). The characteristics of a TMDS link include the following:

1. video data are encoded and then transmitted as encoded words (each 8-bit word of digital video data is converted to an encoded 10-bit word before transmission);
    a. the encoding determines a set of "in-band" words and a set of "out-of-band" words (the encoder can generate only "in-band" words in response to video data, although it can generate "out-of-band" words in response to control or sync signals. Each in-band word is an encoded word resulting from encoding of one input video data word. All words transmitted over the link that are not in-band words are "out-of-band" words);
    b. the encoding of video data is performed such that the in-band words are transition minimized (a sequence of in-band words has a reduced or minimized number of transitions);
    c. the encoding of video data is performed such that the in-band words are DC balanced (the encoding prevents each transmitted voltage waveform that is employed to transmit a sequence of in-band words from deviating by more than a predetermined threshold value from a reference potential. Specifically, the tenth bit of each "in-band" word indicates whether eight of the other nine bits thereof have been inverted during the encoding process to correct for an imbalance between running counts of ones and zeroes in the stream of previously encoded data bits);
2. the encoded video data and a video clock signal are transmitted as differential signals (the video clock and encoded video data are transmitted as differential signals over conductor pairs);
3. three conductor pairs are employed to transmit the encoded video, and a fourth conductor pair is employed to transmit the video clock signal; and
4. signal transmission occurs in one direction, from a transmitter (typically associated with a desktop or portable computer, or other host) to a receiver (typically an element of a monitor or other display device).

A use of the TMDS serial link is the "Digital Visual Interface" interface ("DVI" link) adopted by the Digital Display Working Group. It will be described with reference to FIG. 1. A DVI link can be implemented to include two TMDS links (which share a common conductor pair for transmitting a video clock signal) or one TMDS link, as well as additional control lines between the transmitter and receiver. The DVI link of FIG. 1 includes transmitter 1, receiver 3, and the following conductors between the transmitter and receiver: four conductor pairs (Channel 0, Channel 1, and Channel 2 for video data, and Channel C for a video clock signal), Display Data Channel ("DDC") lines for bidirectional communication between the transmitter and a monitor associated with the receiver in accordance with the conventional Display Data Channel standard (the Video Electronics Standard Association's "Display Data Channel Standard," Version 2, Rev. 0, dated Apr. 9, 1996), a Hot Plug Detect (HPD) line (on which the monitor transmits a signal that enables a processor associated with the transmitter to identify the monitor's presence), Analog lines (for transmitting analog video to the receiver), and Power lines (for providing DC power to the receiver and a monitor associated with the receiver). The Display Data Channel standard specifies a protocol for bidirectional communication between a transmitter and a monitor associated with a receiver, including transmission by the monitor of an Extended Display Identification ("EDID") message that specifies various characteristics of the monitor, and transmission by the transmitter of control signals for the monitor. Transmitter 1 includes three identical encoder/serializer units (units 2, 4, and 6) and additional circuitry (not shown). Receiver 3 includes three identical recovery/decoder units (units 8, 10, and 12) and inter-channel alignment circuitry 14 connected as shown, and additional circuitry (not shown).

Figure 1:
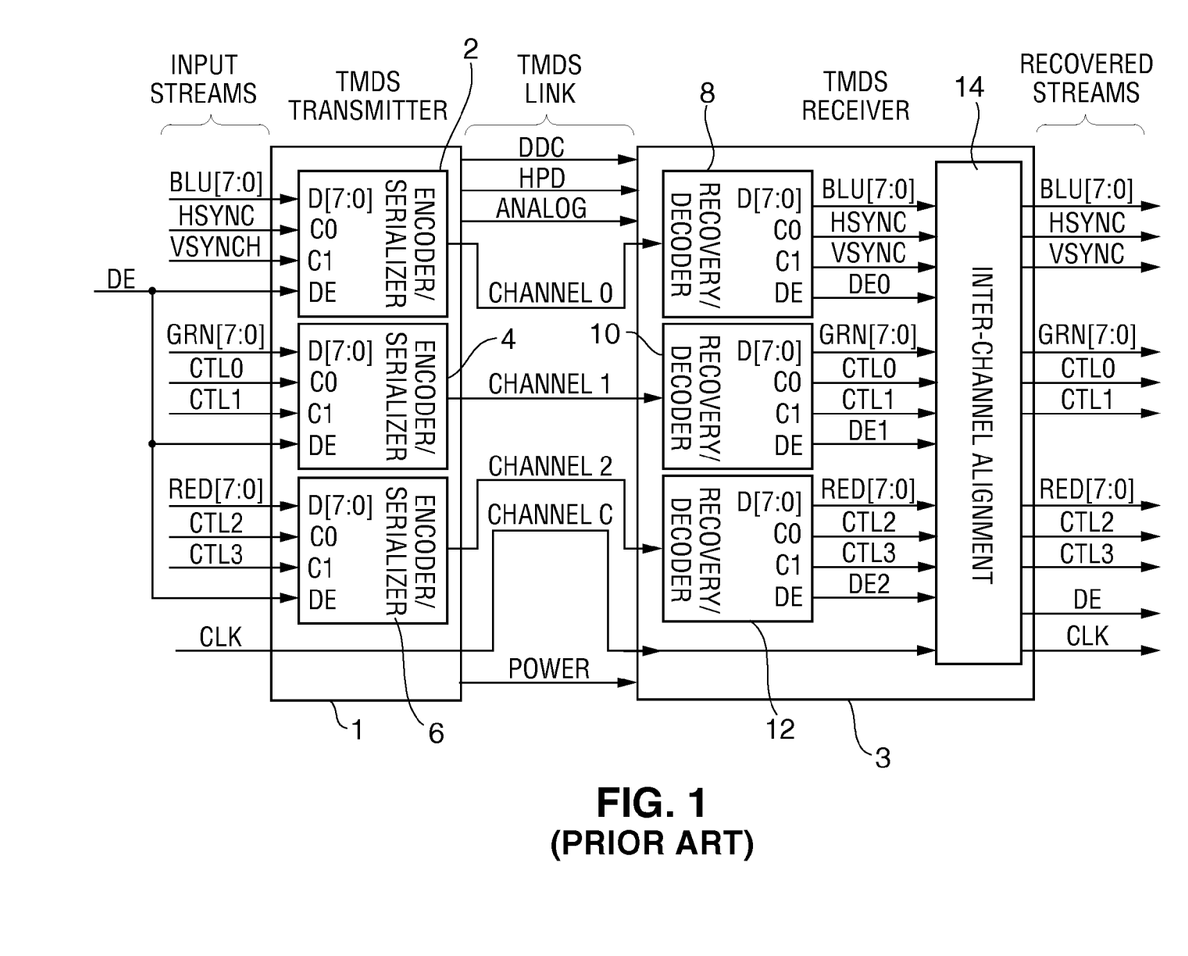
FIG. 1 is a block diagram of a conventional system including a Digital Visual Interface ("DVI") link.

As shown in FIG. 1, circuit 2 encodes the data to be transmitted over Channel 0, and serializes the encoded bits. Similarly, circuit 4 encodes the data to be transmitted over Channel 1 (and serializes the encoded bits), and circuit 6 encodes the data to be transmitted over Channel 2 (and serializes the encoded bits). Each of circuits 2, 4, and 6 responds to a control signal (an active high binary control signal referred to as a "data enable" or "DE" signal) by selectively encoding either digital video words (in response to DE having a high value) or a control or synchronization signal pair (in response to DE having a low value). Each of encoders 2, 4, and 6 receives a different pair of control or synchronization signals: encoder 2 receives horizontal and vertical synchronization signals (HSYNC and VSYNC); encoder 4 receives control bits CTL0 and CTL1; and encoder 6 receives control bits CTL2 and CTL3. Thus, each of encoders 2, 4, and 6 generates in-band words indicative of video data (in response to DE having a high value), encoder 2 generates out-of-band words indicative of the values of HSYNC and VSYNC (in response to DE having a low value), encoder 4 generates out-of-band words indicative of the values of CTL0 and CTL1 (in response to DE having a low value), and encoder 6 generates out-of-band words indicative of the values of CTL2 and CTL3 (in response to DE having a low value). In response to DE having a low value, each of encoders 4 and 6 generates one of four specific out-of-band words indicative of the values 00, 01, 10, or 11, respectively, of control bits CTL0 and CTL1 (or CTL2 and CTL3).

It has been proposed to use the cryptographic protocol known as the "High-bandwidth Digital Content Protection" ("HDCP") protocol to encrypt digital video to be transmitted over a DVI link and to decrypt the data at the DVI receiver. The HDCP protocol is described in the document "High-bandwidth Digital Content Protection System," Revision 1.0, dated February 17, 2000, by Intel Corporation, and the document "High-bandwidth Digital Content Protection System Revision 1.0 Erratum," dated Mar. 19, 2001, by Intel Corporation. The full text of both of these documents is incorporated herein by reference.

Another serial link is the proposed "High Definition Multimedia Interface" interface ("HDMI" link) being developed Silicon Image, Inc., Matsushita Electric, Royal Philips Electronics, Sony Corporation, Thomson Multimedia, Toshiba Corporation, and Hitachi.

A DVI (or HDMI-compliant) transmitter implementing the HDCP protocol asserts a stream of pseudo-randomly generated 24-bit words, known as cout[23:0], during each active period (i.e. when DE is high). In a DVI-compliant system, each active period is an active video period. In an HDMI-compliant system, each active period is a period in which video, audio, or other data are transmitted. Each 24-bit word of the cout data is "Exclusive Ored" (in logic circuitry in the transmitter) with a 24-bit word of RGB video data input to the transmitter, in order to encrypt the video data. The encrypted data are then encoded (according to the TMDS standard) for transmission. The same sequence of cout words is also generated in the receiver. After the encoded and encrypted data received at the receiver undergo TMDS decoding, the cout data are processed together with the decoded video in logic circuitry in order to decrypt the decoded data and recover the original input video data.

Before the transmitter begins to transmit HDCP encrypted, encoded video data, the transmitter and receiver communicate bidirectionally with each other to execute an authentication protocol (to verify that the receiver is authorized to receive protected content, and to establish shared secret values for use in encryption of input data and decryption of transmitted encrypted data). More specifically, each of the transmitter and the receiver is preprogrammed (e.g., at the factory) with a 40-bit word known as a key selection vector, and an array of forty 56-bit private keys. To initiate the first part of an authentication exchange between the transmitter and receiver, the transmitter asserts its key selection vector (known as "AKSV"), and a pseudo-randomly generated session value ("An") to the receiver. In response, the receiver sends its key selection vector (known as "BKSV") and a repeater bit (indicating whether the receiver is a repeater) to the transmitter, and the receiver also implements a predetermined algorithm using "AKSV" and the receiver's array of forty private keys to calculate a secret value ("Km"). In response to the value "BKSV" from the receiver, the transmitter implements the same algorithm using the value "BKSV" and the transmitter's array of forty private keys to calculate the same secret value ("Km") as does the receiver.

Each of the transmitter and the receiver then uses the shared value "Km," the session value "An," and the repeater bit to calculate a shared secret value (the session key "Ks"), a value ("R0") for use in determining whether the authentication is successful, and a value ("M0") for use during a second part of the authentication exchange. The second part of the authentication exchange is performed only if the repeater bit indicates that the receiver is a repeater, to determine whether the status of one or more downstream devices coupled to the repeater requires revocation of the receiver's authentication.

Figure 2:
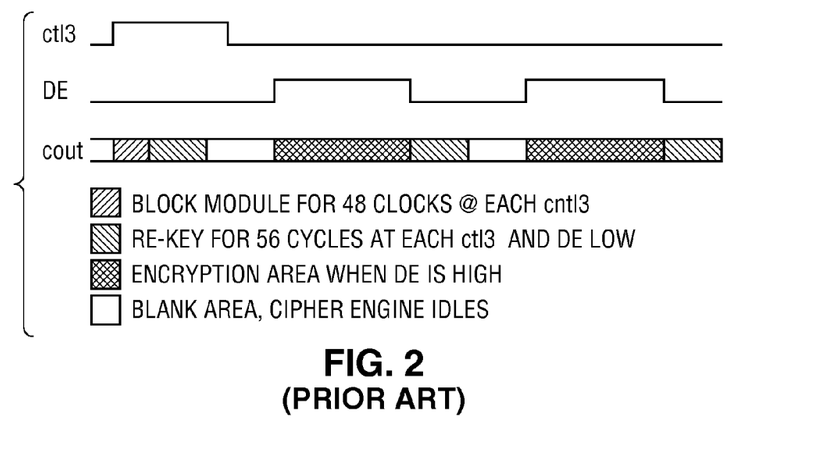
FIG. 2 is a timing diagram of signals generated conventionally to encrypt digital video data to be transmitted over a DVI link using the conventional High-bandwidth Digital Content Protection ("HDCP") protocol.

After the first part of the authentication exchange, and (if the second part of the authentication exchange is performed) if the receiver's key selection vector is not revoked as a result of the second part of the authentication exchange, each of the transmitter and the receiver generates a 56-bit frame key Ki (for initiating the encryption or decrypting a frame of video data), an initialization value Mi, and a value Ri used for link integrity verification. The Ki, Mi, and Ri values are generated in response to a control signal (identified as "ctl3" in FIG. 2), which is received at the appropriate circuitry in the transmitter, and is also sent by the transmitter to the receiver, during each vertical blanking period, when DE is low. As shown in the timing diagram of FIG. 2, the control signal "ctl3" is a single high-going pulse. In response to the Ki, Mi, and Ri values, each of the transmitter and receiver generates a sequence of pseudo-randomly generated 24-bit words cout [23:0]. Each 24-bit word of the cout data generated by the transmitter is "Exclusive Ored" (in logic circuitry in the transmitter) with a 24-bit word of a frame of video data (to encrypt the video data). Each 24-bit word of the cout data generated by the receiver is "Exclusive Ored" (in logic circuitry in the receiver) with a 24-bit word of the first received frame of encrypted video data (to decrypt this encrypted video data). The 24-bit words cout[23:0] generated by the transmitter are content encryption keys (for encrypting a line of input video data), and the 24-bit words cout[23:0] generated by the receiver are content decryption keys (for decrypting a received and decoded line of encrypted video data).

During each horizontal blanking interval (in response to each falling edge of the data enable signal DE) following assertion of the control signal ctl3, the transmitter performs a rekeying operation and the receiver performs the same rekeying operation to change (in a predetermined manner) the cout data words to be asserted during the next active video period. This continues until the next vertical blanking period, when the control signal ctl3 is again asserted to cause each of the transmitter and the receiver to calculate a new set of Ki and Mi values (with the index "i" being incremented in response to each assertion of the control signal ctl3). The Ri value is updated once every 128 frames. Actual encryption of input video data or decryption of received, decoded video data (or encryption of input video, audio, or other data, or decryption of received, decoded video, audio, or other data, in the case of an HDMI-compliant system) is performed, using the cout data words generated in response to the latest set of Ks, Ki and Mi values, only when DE is high (not during vertical or horizontal blanking intervals).

Figure 3:
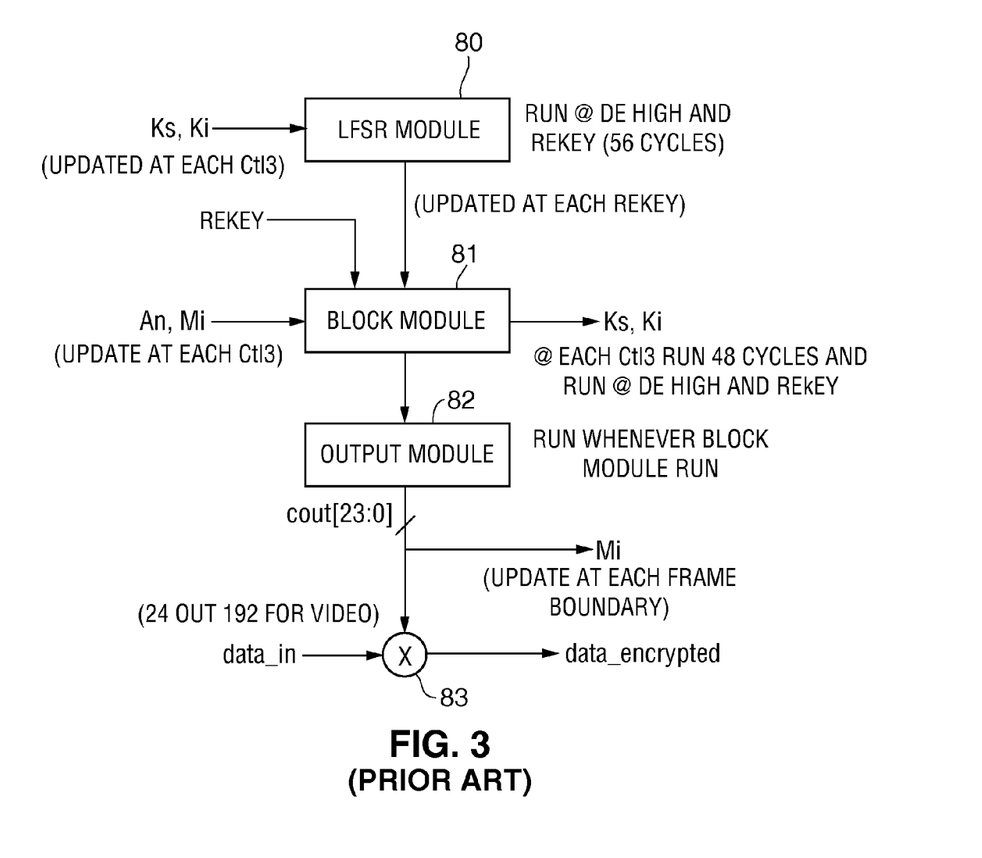
FIG. 3 is a block diagram of conventional circuitry for encrypting digital video data to be transmitted over a DVI link.

Each of the transmitter and receiver includes an HDCP cipher circuit (sometimes referred to herein as an "HDCP cipher") of the type shown in FIG. 3. The HDCP cipher includes linear feedback shift register (LFSR) module 80, block module 81 coupled to the output of LFSR module 80, and output module 82 coupled to an output of block module 81. LFSR module 80 is employed to re-key block module 81 in response to each assertion of an enable signal (the signal "ReKey" shown in FIG. 3), using the session key (Ks) and the current frame key (Ki). Block module 81 generates (and provides to module 80) the key Ks at the start of a session and generates (and applies to module 80) a new value of key Ki at the start of each frame of video data (in response to a rising edge of the control signal "ctl3," which occurs in the first vertical blanking interval of a frame). The signal "ReKey" is asserted to the FIG. 3 circuit at each falling edge of the DE signal (i.e., at the start of each vertical and each horizontal blanking interval), and at the end of a brief initialization period (during which module 81 generates an updated value of the frame key Ki) after each rising edge of signal "ctl3."

Module 80 consists of four linear feedback shift registers (having different lengths) and combining circuitry coupled to the shift registers and configured to assert a single output bit per clock interval to block module 81 during each of a fixed number of clock cycles (e.g., 56 cycles) commencing on each assertion of the signal "ReKey" when DE is low (i.e., in the horizontal blanking interval of each line of video data). This output bit stream is employed by block module 81 to re-key itself just prior to the start of transmission or reception of each line of video data.

Figure 4:
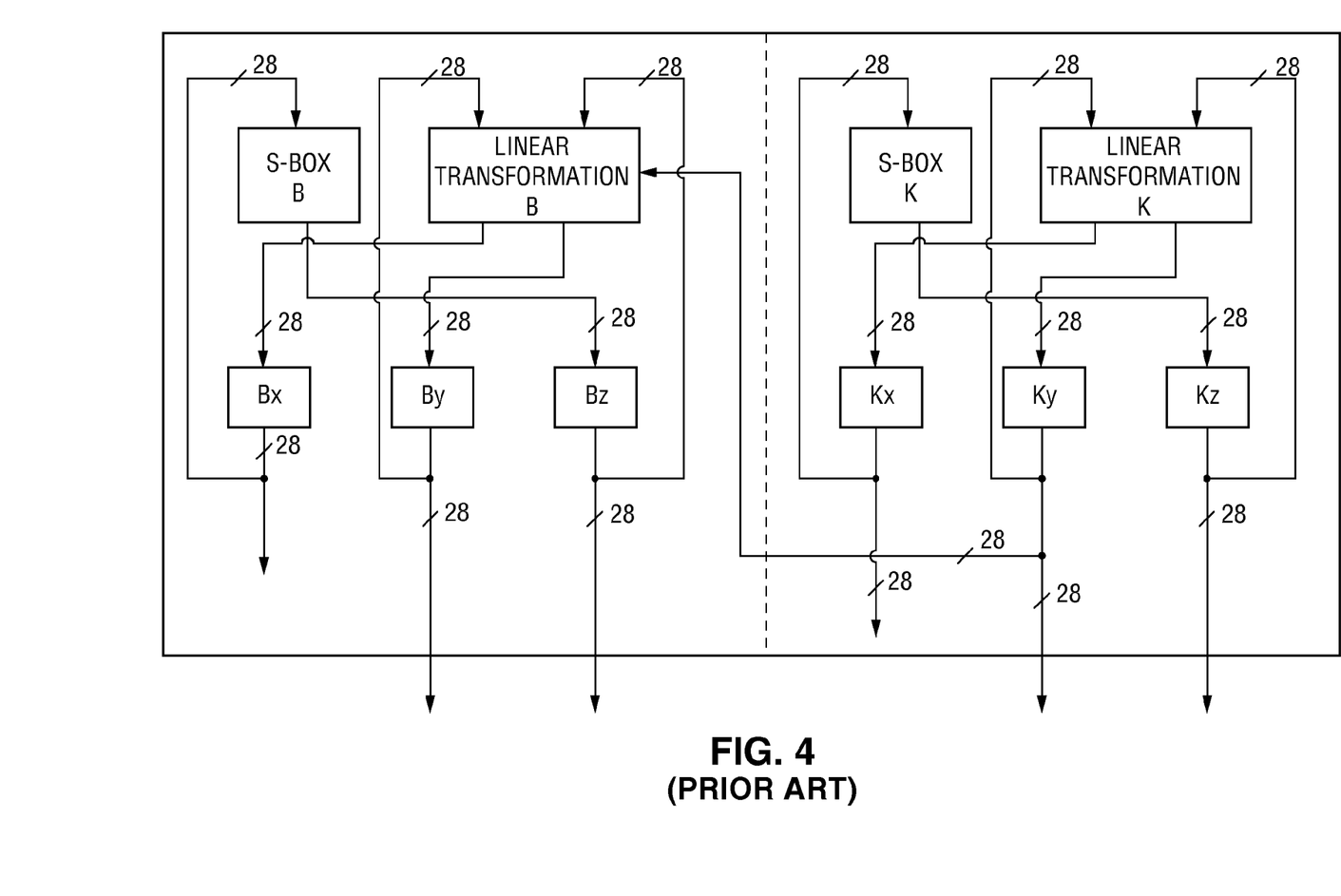
FIG. 4 is a simplified block diagram of module 81 of FIG. 3.

Block module 81 comprises two halves, "Round Function K" and "Round Function B," as shown in FIG. 4. Round Function K includes 28-bit registers Kx, Ky, and Kz, seven S-Boxes (each a 4 input bit by 4 output bit S-Box including a look-up table) collectively labeled "S-Box K" in FIG. 4, and linear transformation unit K, connected as shown. Round Function B includes 28-bit registers Bx, By, and Bz, seven S-Boxes (each a 4 input bit by 4 output bit S-Box including a look-up table) collectively labeled "S-Box B" in FIG. 4, and linear transformation unit B, connected as shown. Round Function K and Round Function B are similar in design, but Round Function K performs one round of a block cipher per clock cycle to assert a different pair of 28-bit round keys (Ky and Kz) each clock cycle in response to the output of LFSR module 80, and Round Function B performs one round of a block cipher per clock cycle, in response to each 28-bit round key Ky from Round Function K and the output of LFSR module 80, to assert a different pair of 28-bit round keys (By and Bz) each clock cycle. The transmitter generates value An at the start of the authentication protocol and the receiver responds to it during the authentication procedure. The value An is used to randomize the session key. Block module 81 operates in response to the authentication value (An), and the initialization value (Mi) which is updated by output module 82 at the start of each frame (at each rising edge of the control signal "ctl3").

Each of linear transformation units K and B outputs 56 bits per clock cycle. These output bits are the combined outputs of eight diffusion networks in each transformation unit. Each diffusion network of linear transformation unit K produces seven output bits in response to seven of the current output bits of registers Ky and Kz. Each of four of the diffusion networks of linear transformation unit B produces seven output bits in response to seven of the current output bits of registers By, Bz, and Ky, and each of the four other diffusion networks of linear transformation unit B produces seven output bits in response to seven of the current output bits of registers By and Bz.

In Round Function K, one bit of register Ky takes its input from the bit stream asserted by module 80 when the ReKey signal is asserted. In Round Function B, one bit of register By takes its input from the bit stream asserted by module 80 when the ReKey signal is asserted.

Output module 82 performs a compression operation on the 28-bit keys (By, Bz, Ky and Kz) asserted to it (a total of 112 bits) by module 81 during each clock cycle, to generate one 24-bit block of pseudo-random bits cout[23:0] per clock cycle. Each of the 24 output bits of module 82 consists of the exclusive OR ("XOR") of nine terms as follows: (B0*K0)+ (B1*K1)+(B2*K2)+(B3*K3)+(B4*K4)+(B5*K5)+ (B6*K6)+(B7)+(K7), where "*" denotes a logical AND operation and "+" denotes a logical XOR operation.

In the transmitter, logic circuitry 83 (shown in FIG. 3) receives each 24-bit word of cout data and each input 24-bit RGB video data word, and performs a bitwise XOR operation thereon in order to encrypt the video data, thereby generating a word of the "data_encrypted" data indicated in FIG. 3. Typically, the encrypted data subsequently undergoes TMDS encoding before it is transmitted to a receiver. In the receiver, logic circuitry 83 (shown in FIG. 3) receives each 24-bit block of cout data and each recovered 24-bit RGB video data word (after the recovered data has undergone TMDS decoding), and performs a bitwise XOR operation thereon in order to decrypt the recovered video data.

Throughout the specification the expression "TMDS-like link" will be used to denote a serial link capable of transmitting encoded data (e.g., encoded digital video data) and a clock for the encoded data, from a transmitter to a receiver, and also capable of transmitting (bidirectionally or unidirectionally) one or more additional signals (e.g., encoded digital audio data or other encoded data) between the transmitter and receiver, that is or includes either a TMDS link or a link having some but not all of the characteristics of a TMDS link. Examples of TMDS-like links include links that differ from TMDS links only by encoding data as N-bit code words (where N 10, and thus are not 10-bit TMDS code words) and links that differ from TMDS links only by transmitting encoded video over more than three or less than three conductor pairs. Some TMDS-like links encode input video data (and other data) to be transmitted into encoded words comprising more bits than the incoming data using a coding algorithm other than the specific algorithm used in a TMDS link, and transmit the encoded video data as in-band characters and the other encoded data as out-of-band characters (HDMI-compliant systems encode audio data for transmission according to an encoding scheme that differs from the encoding scheme employed for video data). The characters need not be classified as in-band or out-of-band characters based according to whether they satisfy transition minimization and DC balance criteria. Rather, other classification criteria could be used. An example of an encoding algorithm, other than that used in a TMDS link but which could be used in a TMDS-like link, is IBM 8b10b coding. The classification (between in-band and out-of-band characters) need not be based on just a high or low number of transitions. For example, the number of transitions of each of the in-band and out-of-band characters could (in some embodiments) be in a single range (e.g., a middle range defined by a minimum and a maximum number of transitions).

The expression "cryptographic device" is used herein to denote a device that includes a cipher engine, where the cipher engine is configured to use at least one key to encrypt content or to decrypt encrypted content. Typical cryptographic devices that embody the invention are transmitters and receivers. The term "transmitter" is used herein in a broad sense to denote any unit capable of transmitting data over a link and optionally also encoding and/or encrypting the data to be transmitted. The term "receiver" is used herein in a broad sense to denote any unit capable of receiving data that has been transmitted over a link (and optionally also decoding and/or decrypting the received data). Unless otherwise specified, a link can but need not be a TMDS-like link or other serial link. The term transmitter can denote a transceiver that performs the functions of a receiver as well as the functions of a transmitter.

The expression "content key" is used herein to denote data (sometimes referred to herein as a "content encryption" key) that can be used by a cryptographic device to encrypt content (e.g., video, audio, or other content), or to denote data (sometimes referred to herein as a "content decryption" key) that can be used by a cryptographic device to decrypt encrypted content.

The term "key" is used herein to denote a content key, or data that can be used by a cryptographic device to generate or otherwise obtain (in accordance with a content protection protocol) a content key. The expressions "key" and "key data" are used interchangeably herein. The term "key set" denotes one key or more than one key.

The term "stream" of data, as used herein, denotes that all the data are of the same type and are transmitted with the same clock frequency. The term "channel," as used herein, refers to that portion of a link that is employed to transmit data (e.g., a particular conductor or conductor pair between the transmitter and receiver over which the data are transmitted, and specific circuitry within the transmitter and/or receiver used for transmitting and/or recovery of the data) and to the technique employed to transmit the data over the link.

Until the present invention, cryptographic devices that implement the conventional HDCP protocol (and other cryptographic devices that use "unique" key sets, in the sense that each device uses a key set that is used by no other device, or only by a small number of devices) have been difficult to test. The results of successfully testing each such device (e.g., by encrypting or decrypting known data using the device's key set and/or performing an authentication exchange with the device) will vary from device to device. Also, cryptographic devices that use unique key sets are often implemented as integrated circuits in which the key sets are stored in non-volatile memory (which adds greatly to the cost of manufacturing the devices). Another difficulty in testing an integrated circuit implementation of a cryptographic device (of the type that uses a unique key set) arises because some (or some aspects) of the device's internal states must be kept confidential to avoid releasing cryptographically sensitive information. This limits visibility and thus testability.

Also until the present invention, authentication exchanges between cryptographic devices that implement the conventional HDCP protocol (and other cryptographic devices that use unique key sets) had been time-consuming or had required expensive random access memory (RAM) to store a key set. In a typical integrated circuit implementation of such a cryptographic device, a key set (e.g., a key selection vector to be sent to another device during an authentication exchange, and a private key array to be employed with a key selection vector received from another device to calculate a secret value "Km") is stored in non-volatile semiconductor memory (e.g., EEPROM or flash memory). During each authentication exchange, the stored key set must be read from the non-volatile memory and stored in RAM within the chip, or the key set read from the non-volatile memory must be employed to perform the necessary calculations on the fly (without storing the key set in RAM). When the key set read from the non-volatile memory was stored in RAM, a large RAM had typically been required which added significantly to the cost and complexity of the device. When the key set read from non-volatile memory was used to perform the calculations on the fly, a read cycle (which is typically very slow) had to be performed every time an authentication was performed (to read the key set from the non-volatile memory). One of the most time-consuming steps of the latter type of conventionally implemented authentication exchange had been the step of reading the required key set from non-volatile semiconductor memory.

It has been proposed to implement a cryptographic device to reduce the time required for HDCP authentication exchanges by reading the required key set from non-volatile semiconductor memory just once (e.g., when the device performs its first authentication exchange) and caching the key set in RAM. Subsequent authentication exchanges employ the cached key set instead of retrieving the key set from non-volatile memory. However, such a technique has the disadvantage of allocating a significant amount of RAM for use only as a key set cache memory, thus reducing the amount of RAM available for other purposes or requiring use of RAM having significantly larger capacity than would otherwise be needed.

The present invention (to be described below) greatly reduces or eliminates the above-noted limitations and disadvantages of the designs and methods of operating conventional cryptographic devices.

The term "HDCP protocol" is used herein in a broad sense to denote both the conventional HDCP protocol and modified HDCP protocols that closely resemble the conventional HDCP protocol but differ therefrom in one or more respects. Some but not all embodiments of the invention implement an HDCP protocol. The conventional HDCP protocol encrypts (or decrypts) data during active video periods but not during blanking intervals between active video periods. An example of a modified HDCP protocol is a content protection protocol that differs from the conventional HDCP protocol only to the extent needed to accomplish decryption of data transmitted between active video periods (as well as decryption of video data transmitted during active video periods) or to accomplish encryption of data to be transmitted between active video periods (as well as encryption of video data to be transmitted during active video periods).

SUMMARY OF THE INVENTION

In a class of preferred embodiments, the invention is a cryptographic device operable in a normal operating mode and at least one test mode. Two key sets are stored in the device: and a "test" key set used by each of M devices; and a "normal" key set unique to the device. The normal key set is unique to the device in the sense that it is used only by the device, or is used by each of N devices (where N is much smaller than M). The device uses the normal key set in its normal operating mode to encrypt or decrypt data, and uses the test key set in at least one test mode. Typically, the same test key set is stored in and used by all devices of a common type (e.g., the same model), and each device of this type stores and uses a different normal key set. In preferred embodiments, the inventive device is configured to perform an entire built-in self test ("BIST") itself without receiving key data, parameters, or results from an external device, and can output a "pass/fail" test result upon completing the self test.

In some embodiments, the inventive cryptographic device also stores test data (typically indicative of parameters and/or expected test results) for or pertaining to the test key set. For example, in some embodiments the device implements an HDCP protocol and stores test data indicative of the HDCP session value "An" and test data indicative of an expected result of an HDCP authentication exchange (e.g., the above-mentioned value "R0"). Storage of test data as well as a test key set in the inventive device can allow the device to perform an entire BIST itself and then output a "pass/fail" test result. For example, one embodiment of the invention is a receiver configured to implement the conventional HDCP protocol (or a modified HDCP protocol that closely resembles the conventional HDCP protocol but differs therefrom in one or more respects) to decrypt data from a transmitter during normal operation, to store a test key set, a parameter (e.g., a session value "An") of a type that would be generated by the transmitter during an authentication exchange, and an expected result of an authentication exchange with a transmitter (e.g., the value "R0"), and to perform an entire BIST (without performing an authentication exchange or otherwise communicating with the transmitter or another external device) using the stored parameter, expected result, and test key set.

A built-in self test (BIST) operation by any embodiment of the inventive cryptographic device can be initiated in any of many different ways, including in response to a test command from an external device. A typical BIST operation by an embodiment of the inventive device that stores a normal key set, a test key set, and test data associated with the test key set, includes the steps of: (a) upon initiation of the BIST operation, selecting the test key set rather than the normal key set and accessing the test data; (b) performing an authentication procedure using the test key set and at least some of the test data (e.g., a parameter determined by the test data), and optionally also encrypting or decrypting a block of the test data using the test key set; and (c) comparing at least one result of the authentication procedure (and/or the encryption or decryption) to at least some of the test data (e.g., to test data indicative of at least one expected result) and setting a flag to indicate success or failure (e.g., to indicate whether at least one result of the authentication procedure matches at least one expected result determined by the test data). In some variations on such a BIST operation, a block of test data is decrypted or encrypted during the test, but this block is generated internally in the device or received from an external source. In some alternative embodiments, a BIST operation by an embodiment of the inventive device that stores a normal key set and a test key set includes the steps of: (a) upon initiation of the BIST operation, selecting the test key set rather than the normal key set; (b) performing an authentication procedure using the test key set, and optionally also encrypting or decrypting a block of a test data (e.g., test data generated internally in the device or received from an external source) using the test key set; and (c) comparing at least one result of step (b) to an expected result (e.g., a result received from an external source) and setting a flag to indicate success or failure.

In typical embodiments, storage of the test key set (and any test data associated with the test key set) can be implemented inexpensively. Since the test key set is not unique to a device, it can typically be stored in simple, inexpensive ROM memory.

Use of a ROM that stores a test key set (and any associated test data) reduces the cost of implementing the invention. The cost of implementing the invention is further reduced in some embodiments by reducing the amount of data that is stored in nonvolatile memory for use in test mode operation (e.g., a BIST operation), and employing a smaller, less expensive nonvolatile memory to store the reduced amount of data. For example, some embodiments of the inventive cryptographic device store a result (e.g., an intermediate result) of a predetermined operation on a test key set (and optionally also a partial version of the test key set) rather than storing an entire test key set itself. For example, when the device implements an HDCP protocol, the stored result can be the HDCP value "Km," which is a 56-bit number generated in an early phase of an authentication procedure. Storing the "Km" value in the inventive device instead of an entire test key set (a 40-bit key selection vector and array of forty 56-bit private keys) needed to generate the "Km" value would prevent the early phase of the authentication procedure from being tested as readily as it otherwise could be (unless it is tested in a manner other than by using test keys and test data stored in the device), but allows phases of the authentication procedure after the early phase (and also post-authentication encryption and decryption operations) to be tested readily using the stored "Km" value and optionally also other stored test keys and/or test data.

In another class of preferred embodiments, the invention is a cryptographic device including a cache memory. The cache memory is employed to cache an intermediate result of an authentication exchange, or a portion of a key set used to perform an authentication exchange. The cache memory is smaller than would be required to cache the entire key set employed during the authentication exchange. The use of at least one cached key and/or at least one cached intermediate result allows at least one subsequent authentication exchange to be performed more rapidly than it could be performed conventionally. In some embodiments, the device is implemented as an integrated circuit including non-volatile semiconductor memory that stores an entire key set. When such a device performs an authentication exchange (e.g., the first one performed by the device), the entire key set is read from the non-volatile memory and employed to generate at least one intermediate result, and at least one such intermediate result is cached for use in subsequent authentication exchanges.

For example, in an embodiment in which the device is a receiver that implements an HDCP protocol, the device reads the entire key set from the non-volatile memory during an initial authentication exchange, employs the key set (with a key selection vector received from the transmitter) to generate an intermediate result (e.g., the shared value "Km"), and caches the intermediate result. The shared value "Km" is well suited to caching since it depends only on the receiver's keys (which typically never change) and the key selection vector received from the transmitter (the "transmitter KSV") which very rarely changes in the typical environment. The transmitter KSV and the receiver's own key selection vector (the receiver KSV) can also be cached, or the transmitter KSV can be used to validate a cached shared value "Km." In a subsequent authentication exchange, the receiver checks whether the newly received "transmitter KSV" matches the cached "transmitter KSV" before retrieving any key data from non-volatile memory. Whether or not the new transmitter KSV matches the cached transmitter KSV, the receiver sends the cached "receiver KSV" to the transmitter (rather than retrieving a KSV from non-volatile memory). If the new transmitter KSV matches the cached transmitter KSV, the receiver uses the cached "Km" value to perform the rest of the exchange (rather than retrieving key data from non-volatile memory to generate a new "Km" value). If the new transmitter KSV does not match the cached transmitter KSV, the receiver retrieves key data from non-volatile memory to use (with the newly received transmitter KSV) to generate a new "Km" value. Typically, the transmitter KSV will change only very rarely during a sequence of authentication exchanges between a receiver and each of one or more transmitters and thus the inventive caching technique typically greatly reduces the average time required to perform each authentication exchange in the sequence. Only a small amount of cache memory is needed since each KSV consists of only 5 bytes and each Km value consists of only 7 bytes. In some embodiments, only a portion of a KSV and/or Km value (or a mathematical hash of a KSV and/or Km value) is cached. This would reduce the size of the cache memory that would otherwise be needed to cache the entire KSV and/or Km value, but would typically do so at the cost of experiencing more false cache hits or implementing additional extra logic.

In some preferred embodiments the inventive cryptographic device is a transmitter for use in encrypting and encoding data for transmission over a link. In other preferred embodiments, the inventive cryptographic device is a receiver for use in receiving, decoding, and decrypting encoded data transmitted over a link. In another class of embodiments, the invention is a communication system including a transmitter, a receiver, and a link between the transmitter and receiver, in which at least one of the transmitter and receiver is an embodiment of the inventive cryptographic device, and the system is configured to transmit at least one stream of encoded, encrypted data over the link from the transmitter to the receiver. In preferred embodiments, the link is a TMDS, TMDS-like, or other serial link.

Other aspects of the invention are methods that can be implemented by any embodiment of the inventive system or cryptographic device.

DETAILED DESCRIPTION OF THE PREFERRED EMBODIMENTS

The term "expected result" is used herein, including in the claims, in a broad sense, to denote an expected final result or an expected intermediate result or an expected precursor of an expected final result. For example, an expected final result of an HDCP authentication exchange is the above-mentioned value, "R0", and an expected precursor of such expected final result is the above-mentioned value "Km". Both "R0" and "Km" are "expected results."

Figure 5:
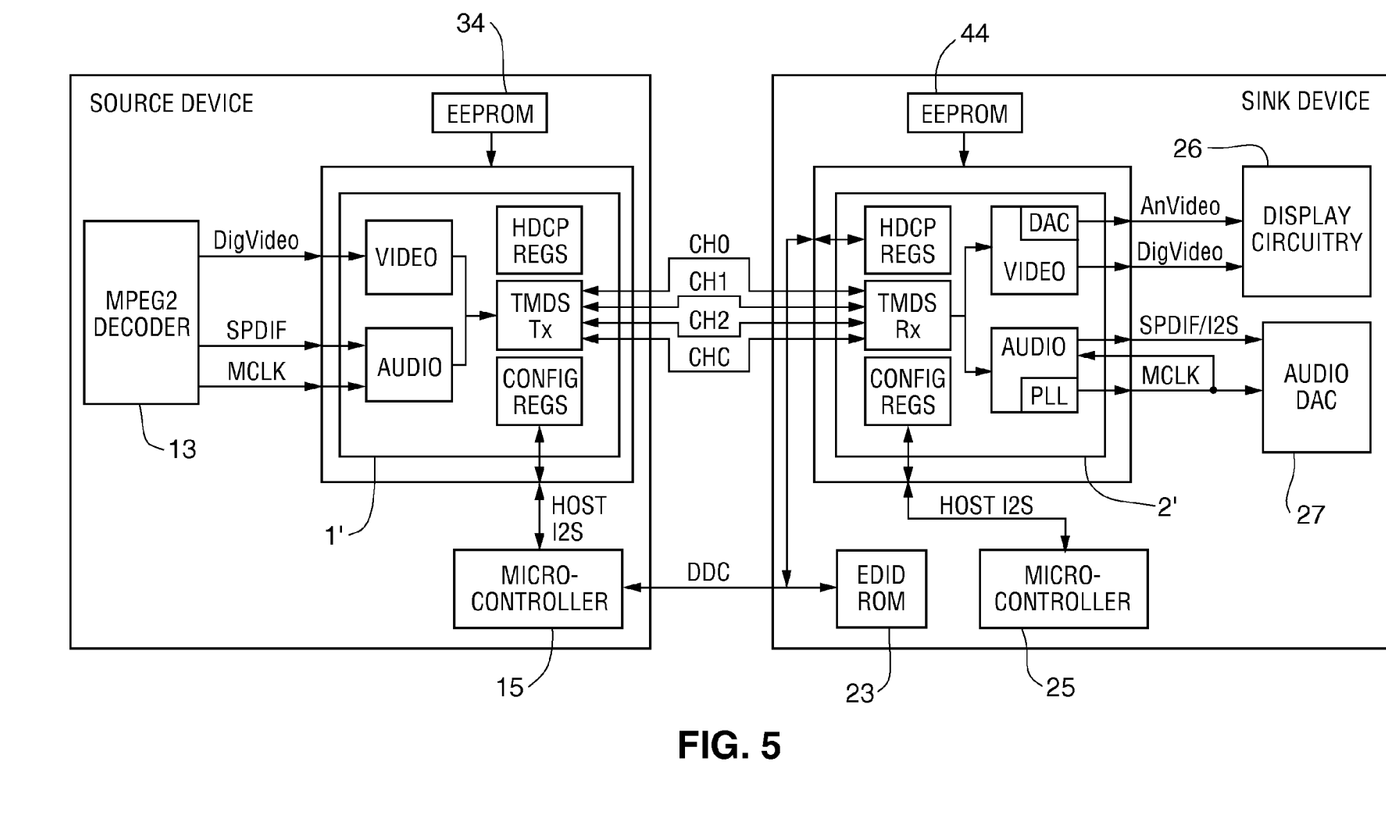
FIG. 5 is a block diagram of a system that embodies the invention.

A class of embodiments of the invention can be implemented by a system of a type shown in FIG. 5. The TMDS link between transmitter 1' and receiver 2' of FIG. 5 is identical to the TMDS link between transmitter 1 and receiver 3 in FIG. 1, although some of the conductors thereof are shown in FIG. 1 but not in FIG. 5 (for simplicity). The FIG. 5 system performs the functions of the FIG. 1 system, and is also configured to encode audio data (or other auxiliary data), to transmit the encoded auxiliary data over one or more of Channel 0, Channel 1, and Channel 2 of the TMDS link (labeled CH0, CH1, and CH2 in FIG. 5) and also to transmit encoded video data over each such channel, and to decode the encoded auxiliary data as well as the encoded video data.

Transmitter 1' and receiver 2' of FIG. 5 correspond, respectively, to transmitter 1 and receiver 3 of FIG. 1, but perform auxiliary data encoding, transmission, and decoding functions that are not performed by transmitter 1 and receiver 3 of FIG. 1. Transmitter 1' of FIG. 5 is an element of a source device that also includes MPEG2 decoder 13 and microcontroller 15, coupled as shown. Decoder 13 asserts input video ("DigVideo") to a video data processing subsystem of transmitter 1', and input audio data ("SPDIF") and audio reference clock ("MCLK") to an audio data processing subsystem of transmitter 1'. The input audio data can be indicative of two or more streams of audio data (e.g., left and right stereo signals).

In alternative embodiments, input audio and/or video come from another source (such as a software decoder or a DVI input). Also, in alternative embodiments microcontroller 15 is implemented as or replaced by a dedicated state machine or a more general purpose microprocessor.

EEPROM 34 stores key data for use in HDCP encryption of content to be transmitted to receiver 2'. More specifically, EEPROM 34 stores a "normal" key set unique to transmitter 1' and a test key set used by each of a large number of transmitters including transmitter 1'. Transmitter 1' uses the normal key set in a normal operating mode to encrypt data to be transmitted to receiver 2', and uses the test key set in at least one test mode (to be described below). In some implementations, EEPROM 34 also stores test data (typically indicative of parameters and/or expected test results) for the test key set.

Receiver 2' of FIG. 5 is an element of a sink device that also includes EDID ROM 23, microcontroller 25, display circuitry 26, and audio digital-to-analog converter 27 ("DAC" 27), coupled as shown. EDID ROM 23 is coupled to the DDC channel of the TMDS link, and stores status and configuration bits which can be read by microcontroller 15 over the DDC channel. Receiver 2' also includes an interface (e.g., interface 201 of FIG. 7) for communication via the DDC channel with microcontroller 15. Microcontroller 25 is coupled for I2C communication with receiver 2'. EEPROM 44 stores key values and identification bits for use in HDCP decryption of content received from transmitter 1'.

The sink device also includes display circuitry 26 which receives analog and/or digital video recovered by receiver 2', audio digital-to-analog converter 27 (DAC 27) which receives digital audio recovered by receiver 2', and EEPROM 44 which stores key data for use in HDCP decryption of content received from transmitter 1'.

More specifically, EEPROM 44 stores a "normal" key set unique to receiver 2' and a "test" key set used by each of a large number of receivers including receiver 2'. Receiver 2' uses the normal key set in a normal operating mode to decrypt data received from transmitter 1', and uses the test key set in at least one test mode (to be described below). In some implementations, EEPROM 44 also stores test data (typically indicative of parameters and/or expected test results) for the test key set.

The FIG. 5 system transmits a video clock over a conductor pair (labeled "CHC" in FIG. 5) of the TMDS link, and also transmits a clock for the auxiliary data over at least one channel of the link. For example, transmitter 1' transmits video data to receiver 2' over channels CH0, CH1, and CH2 (which are identical to Channels 0, 1, and 2 of the FIG. 1 system) during active video periods, transmits audio data (e.g., left and right stereo signals) over one or more of channels CH0, CH1, and CH2 to receiver 2' at times other than during the active video periods, continuously transmits a video clock (e.g., determined by the rising edges of a binary waveform) over channel CHC, and transmits time stamp data (over one or more of Channels 0, 1, and 2) with each burst of the audio data. The time stamp data, with the video clock, determine a clock for the audio data. Receiver 2' is configured to process the time stamp data to regenerate the audio clock employed to transmit the audio data.

Each of transmitter 1' and receiver 2' is operable in a test mode as well as in a normal operating mode. Transmitter 1' uses the normal key set stored in EEPROM 34 in its normal operating mode and uses the test key set stored in EEPROM 34 in at least one test mode. Receiver 2' uses the normal key set stored in EEPROM 44 in its normal operating mode and uses the test key set stored in EEPROM 44 in at least one test mode. Typically, a large number of transmitters of the same type (e.g., the same model) as transmitter 1' use a test key set identical to that stored in EEPROM 34 for test mode operation, and a large number of receivers of the same type (e.g., the same model) as receiver 2' use a test key set identical to that stored in EEPROM 44 for test mode operation. EEPROM 34 preferably also stores test data for the test key set stored therein. In typical embodiments, such test data are indicative of the above-mentioned HDCP session value "An" and the above-mentioned HDCP value "R0" for use in a built-in self test ("BIST"), and transmitter 1' is configured to perform an entire BIST itself using test data and a test key set stored in EEPROM 34 without receiving key data, parameters, or results from an external device, and can output a "pass/fail" test result upon completing the self test.

EEPROM 44 preferably also stores test data for the test key set stored therein. In typical embodiments, such test data are indicative of the above-mentioned HDCP session value "An" and the above-mentioned HDCP value "R0" for use in a BIST, and receiver 2' is configured to perform an entire BIST itself using test data and a test key set stored in EEPROM 44 without receiving key data, parameters, or results from an external device, and can output a "pass/fail" test result upon completing the self test.

Preferably, receiver 2' is configured to implement a modified HDCP protocol that closely resembles the conventional HDCP protocol (but differs therefrom in minor respects to accomplish decryption of audio data transmitted between active video periods, as well as decryption of transmitted video data) to decrypt data from transmitter 1' during normal operation. Such embodiments of receiver 2' are operable in a test mode to employ the test key set and test data stored therein to perform an entire BIST without performing an authentication exchange or otherwise communicating with transmitter 1' or another external device.

A built-in self test (BIST) operation by receiver 2' (or any other embodiment of the inventive cryptographic device) can be initiated in any of many different ways, including in response to a test command from an external device. A typical BIST operation (by an inventive device that stores a normal key set, a test key set, and test data associated with the test key set) includes the steps of: (a) upon initiation of the BIST operation, selecting the test key set rather than the normal key set and accessing the test data; (b) performing an authentication procedure using at least some of the test data (e.g., a parameter determined by the test data) and the test key set, and optionally also encrypting or decrypting a block of the test data using the test key set; and (c) comparing at least one result of step (b) to at least some of the test data (e.g., an expected result determined by the test data) and setting a flag to indicate success or failure. In some variations on such a BIST operation, a block of test data is decrypted (or encrypted) in step (b), and this block is generated internally in the device or received from an external source.

In some alternative embodiments, a BIST operation by an embodiment of the inventive device that stores a normal key set and a test key set includes the steps of: (a) upon initiation of the BIST operation, selecting the test key set rather than the normal key set; (b) performing an authentication procedure using the test key set, and optionally also encrypting or decrypting a block of a test data (e.g., test data generated internally in the device or received from an external source) using the test key set; and (c) comparing at least one result of step (b) to an expected result (e.g., a result received from an external source) and setting a flag to indicate success or failure.

In other alternative embodiments, a BIST operation by an embodiment of the inventive device that stores a normal key set and a test key set includes the steps of: (a) performing an authentication procedure using a subset of each of the test key set and the normal key set (e.g., the normal key set except for a KSV thereof, together with a KSV of the test key set); (b) performing another authentication procedure using another subset of each of the test key set and the normal key set (e.g., the test key set except for a KSV thereof, together with a KSV of the normal key set); and (c) comparing at least one result of step (a) to at least one result of step (b) and setting a flag to indicate success or failure. For example, step (c) can include the step of comparing an R0 value generated in step (a) with an R0 value generated in step (b) and setting a flag to indicate whether these two values match. Such embodiments allow one to perform many more tests internally, and also provide feedback as to whether or not the normal key set is programmed properly. However, it may not be possible to for the device to store only a partial (or condensed) version of the test key set to implement embodiments of this type. Rather, it may be necessary for the device to store an entire test key set.

In other embodiments, the inventive device stores test data and at least one result that is expected using the normal key set. These could be pre-calculated when the normal key set is loaded. In this way, a test key set need not be stored, and the device could perform a BIST to provide feedback as to whether the normal key set is correct.

In many embodiments, storage of the test key set (and any test data associated with the test key set) can be implemented inexpensively. Since the test key set is not unique to a device, it can typically be stored in simple, inexpensive ROM memory. The level of security needed for the stored test key set and associated test data will depend on the test key set. For example, if the keys of a test key set (stored in a large number of devices) belong to a different key space than do the keys of normal key sets used by the devices, compromise of the test key set would typically not compromise the security of the cryptographic protocol employed by the devices. Typically also, keys stored in ROM on a piece of semiconductor material will inherently be very secure.

In order to reduce the amount of nonvolatile memory needed to store data needed for a BIST operation (and thus reduce the cost of storing data needed for a BIST operation), some embodiments of the inventive cryptographic device store a result of a predetermined operation on a test key set (and optionally also a partial version of the test key set) rather than storing an entire test key set itself.

For example, consider the case that receiver 2' is configured to implement a modified HDCP protocol that closely resembles the conventional HDCP protocol but differs therefrom in minor respects, to accomplish decryption of audio data transmitted from transmitter 1' between active video periods as well as decryption of video data transmitted from transmitter 1' during active video periods. In such a case, EEPROM 44 could store a HDCP secret value "Km" (a 56-bit number conventionally generated in an early phase of an HDCP authentication procedure) rather than an entire test key set (a 40-bit key selection vector and array of forty 56-bit private keys) that would otherwise be needed to generate the "Km" value during a BIST operation. EEPROM 44 could also store test data (e.g., data indicative of the above-mentioned HDCP session value "An" and the above-mentioned HDCP value "R0") for use in a BIST operation. In the example, receiver 2' would be operable in a test mode to employ the value "Km" and the test data stored therein to perform the entire BIST operation without performing an authentication exchange or otherwise communicating with transmitter 1' or another external device.

In the example of the previous paragraph, the HDCP secret value "Km" and any test data for use in the BIST operation would preferably be stored in ROM within receiver 2' rather than in an EEPROM external to receiver 2'. This would allow the BIST operation to be performed easily, whether or not such an external EEPROM is coupled to the receiver (it would not be coupled to the receiver early in a typical manufacturing cycle) and functioning properly.

Storing the "Km" value in EEPROM 44 instead of an entire test key set (a 40-bit key selection vector and array of forty 56-bit private keys) needed to generate the "Km" value would prevent the early phase of the authentication procedure from being tested as readily as it otherwise could be (unless it is tested in a manner other than by using test keys and test data stored in EEPROM 44 or receiver 2'), but allows phases of the authentication procedure after the early phase (and post-authentication encryption and decryption operations) to be tested readily using the stored "Km" value and optionally also other stored test keys and/or test data.

For example, in some embodiments, a BIST operation is performed by an embodiment of the inventive device that stores a normal key set, test data (including at least test data indicative of at least one result (e.g., an intermediate result) of at least one predetermined operation on a test key set), and optionally also part of the test key set. The BIST operation includes the steps of: (a) upon initiation of the BIST operation, selecting the test data indicative of the at least one result (and optionally also selecting any part of the test key set that is stored) rather than the normal key set; (b) performing an authentication procedure using the test data selected in step (a) (and optionally also using any part of the test key set selected in step (a)); and (c) comparing at least one result of step (b) to an expected result and setting a flag to indicate success or failure. Alternatively, step (c) is replaced by the steps of: (d) encrypting or decrypting a block of the test data using at least one result of step (b); and (e) includes the step of comparing at least one result of such encryption or decryption to an expected result and setting a flag to indicate success or failure.

Figure 6:
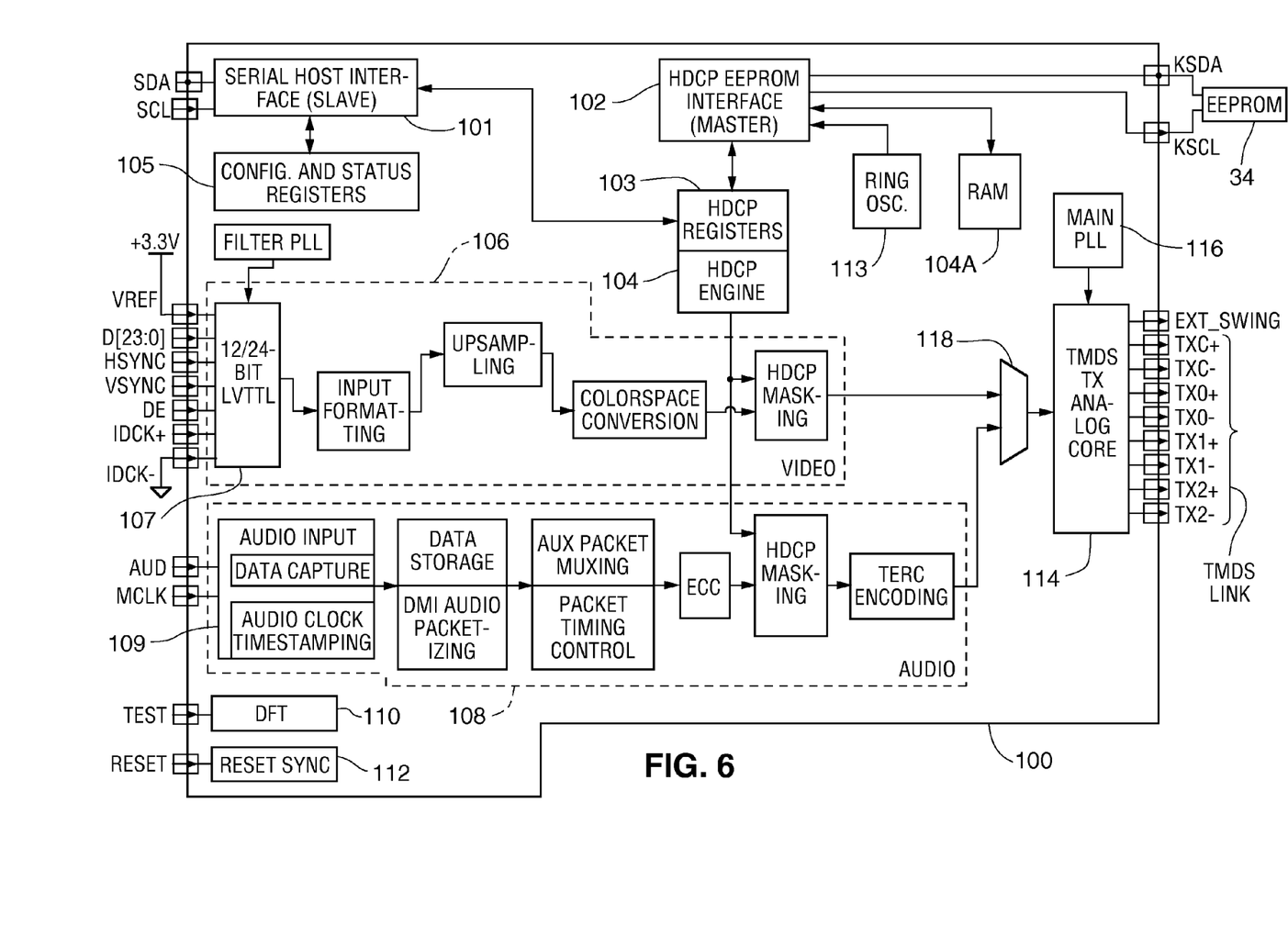
FIG. 6 is a block diagram of a transmitter and a non-volatile memory that embody the invention.
Figure 7:
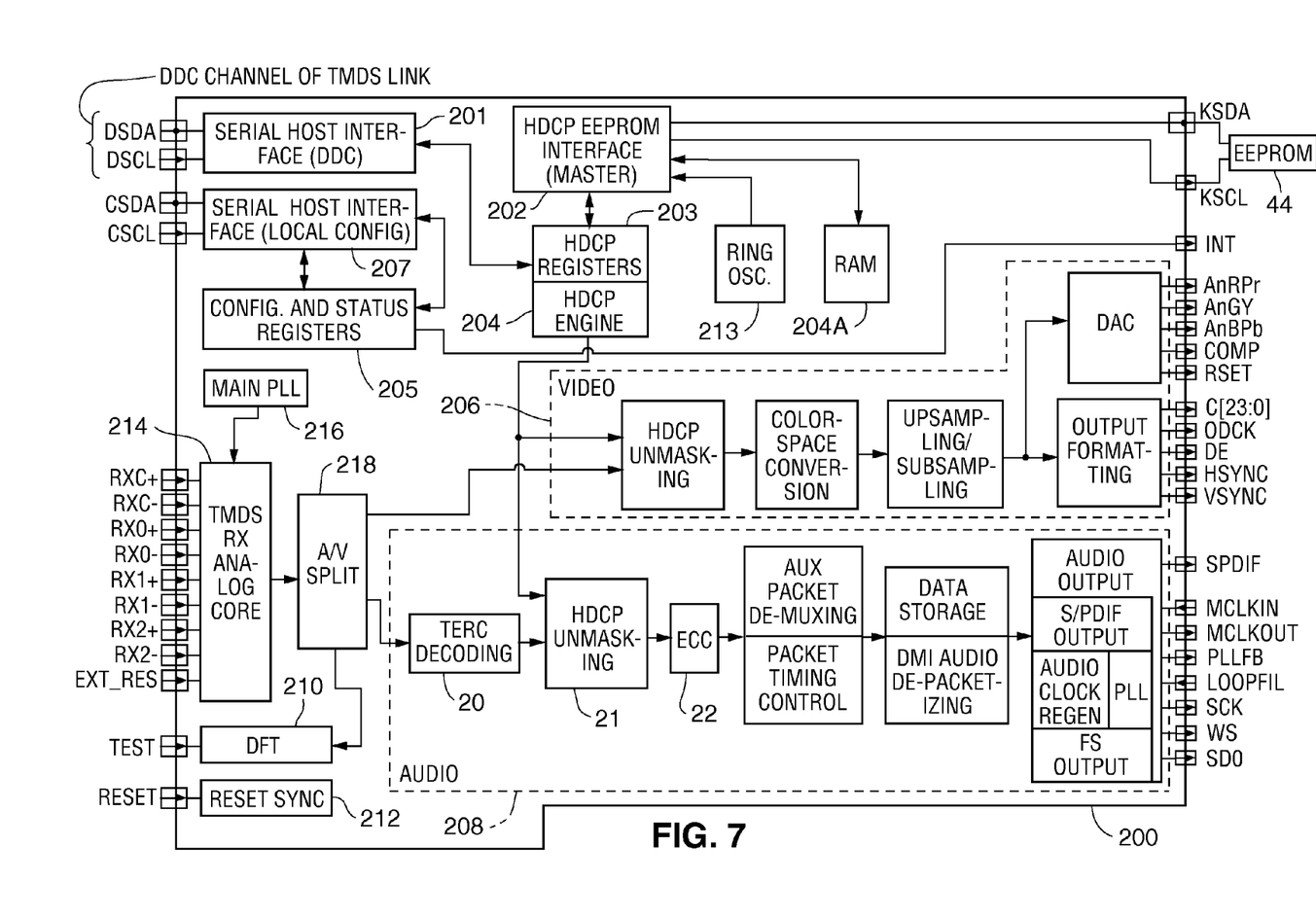
FIG. 7 is a block diagram of a receiver and a non-volatile memory that embody the invention.

Next, with reference to FIGS. 6 and 7, we describe a class of preferred embodiments in which the invention is a cryptographic device that includes a cache memory. The cache memory (e.g., RAM 104A in transmitter 100 of FIG. 6 or RAM 204A in receiver 200 of FIG. 7) is employed to cache a portion of a key set read from nonvolatile memory (e.g., EEPROM 34 of FIG. 6 or EEPROM 44 of FIG. 7) for use in performing an authentication exchange. The cached key data can then be used to perform at least one subsequent authentication exchange, eliminating the need to access the nonvolatile memory again. Alternatively, the cache memory is employed to cache at least one authentication value generated (using at least one key of a key set read from nonvolatile memory) during an authentication exchange, or to cache both such an authentication value and a portion of a key set read from nonvolatile memory. The cached authentication value can then be used to perform at least one subsequent authentication exchange, eliminating the need to access the nonvolatile memory again to retrieve the key set.

RAM 104A (of FIG. 6) and/or RAM 204A (of FIG. 7) can alternatively be employed to store test data and/or a partial test key set, in which case EEPROM 34 and/or EEPROM 44 would typically be used to store a normal key set but not test data or test key data. In some embodiments, RAM 104A and RAM 204A are (or one of RAM 104A and RAM 204A is) used both to cache an authentication value (that has been generated using key data of a normal key set) and/or key data of a normal key set, and also to store test data and/or a partial test key set. Alternatively, two or more memories (typically small random access memories) or registers in each of one or both of transmitter 100 and receiver 200 are used in place of each of RAM 104A and RAM 204A for any of the purposes mentioned herein for which RAM 104A and RAM 204A can be used.

Transmitter 100 of FIG. 6 is an embodiment of the invention which includes cache memory 104A. Transmitter 100 also includes video subsystem 106 which performs pipelined encryption and other pipelined processing (e.g., reformatting, upsampling, and/or color space conversion) on video data D[23:0] received from an external source. Typically, a video data clock (IDCK, referred to herein as a "pixel clock"), a video data enable signal (DE) and horizontal and vertical sync control signals (HSYNC and VSYNC) are received with the input video data from the external source. Subsystem 106 encrypts the input video data (or a reformatted or otherwise processed version of the input video) using pseudo-random values from cipher engine 104 and asserts the encrypted video to a first input of multiplexer 118. During operation, cipher engine 104 uses bits in registers 103. Registers 103 can be loaded with values received via interface 102 (from EEPROM 34) and/or via interface 101.

Typically, interface 101 is coupled for I2C communication with a microcontroller (e.g., microcontroller 15 of FIG. 5). The microcontroller is also coupled to the DDC channel of a TMDS link, and to an input data source (e.g., a video source). Interface 101 can implement an I2C slave protocol to receive information and configuration bits and other bits (e.g., key values received during an HDCP authentication procedure), and load such bits into registers 105 and 103.

Where transmitter 100 is implemented as an integrated circuit, EEPROM 34 (preloaded with a normal key set, and optionally also a test key set and test data) can be implemented as a separate chip in a secure multi-chip module ("MCM") that includes both transmitter 100 and EEPROM 34, or EEPROM 34 can be implemented as a different area of the same chip on which transmitter 100 is implemented. Interface 102 provides the interface between transmitter 100 and EEPROM 34. Interface 102 can retrieve values from EEPROM 34 at appropriate times, such as during an HDCP authentication exchange with a receiver. Interface 102 preferably uses the output of ring oscillator 113 (or another oscillator) to generate a clock (e.g., a 100 KHz clock) for use for I2C communication with EEPROM 34.

Interface 102, coupled to cache memory 104A (which is a random-access memory) is configured to cache in memory 104A a portion of the normal key set read from EEPROM 34 for use in performing an authentication exchange. Interface 102 can then retrieve the key data cached in memory 104A for use in performing at least one subsequent authentication exchange, thus eliminating the need to retrieve such key data from EEPROM 34 again. Interface 102 is also configured to cache in memory 104A at least one authentication value generated (using at least one key of the normal key set read from EEPROM 34) during an authentication exchange. Interface 102 can then retrieve the authentication value cached in memory 104A for use in performing at least one subsequent authentication exchange, thus eliminating the need to again retrieve the key data that was used to generate the authentication value from EEPROM 34.

Cache memory 104A is smaller than would be required to cache the entire key set conventionally employed during the authentication exchange. The use of at least one cached key and/or at least one cached authentication value allows at least one authentication exchange (occurring after the caching) to be performed more rapidly than it could be performed conventionally without caching.

Transmitter 100 also includes audio subsystem 108 which performs pipelined formatting, packetizing, encryption, and other pipelined processing on audio data AUD received from an external source (the data AUD can alternatively be or include auxiliary data other than audio data). In typical implementations, transmitter 100 can accept audio data AUD in S/PDIF format with sample rate Fs in the range from 32 kHz to 48 kHz, or in any of a number of other formats. An audio reference clock ("MCLK") is received with the input data AUD.

Main phase lock loop ("PLL") 116, coupled to TMDS core processor 114 of transmitter 100, generates a stabilized version of the pixel clock IDCK.

Reset circuitry 112 is coupled to a reset pin for receiving a reset bit from an external processor. Transmitter 100 is configured to reset itself to an initial state in response to a predetermined value of the reset bit.

Test circuitry 110 is coupled to a test pin for receiving a test mode bit from an external source. Transmitter 100 is configured to operate in either a test mode or a normal operating mode depending on the value of the test mode bit.

Subsystem 108 of transmitter 100 can sample the audio data using the stabilized pixel clock (provided that the pixel clock frequency is greater than 2*128Fs), the clock MCLK, or a frequency-multiplied version of MCLK. Subsystem 108 generates packets that contain the sampled audio data, encrypts the data in the packets, encodes the encrypted data, and asserts the packets containing encoded, encrypted data to a second input of multiplexer 118.

Subsystem 108 also determines the timing (relative to DE) with which data islands (each data island including one or more of the packets) are asserted to multiplexer 118. Subsystem 108 also time-division-multiplexes control words with the data islands, including control words indicative of: a data island preamble (e.g. subsystem 108 inserts eight pixel clock cycles of auxiliary data preamble words immediately before each data island), HSYNC and VSYNC (e.g., subsystem 108 inserts at least twelve pixel clock cycles of synchronization words before each burst of auxiliary data preamble words), leading and trailing data island guard bands (e.g., subsystem 108 inserts two pixel clock cycles of leading guard band words as the first two words of each data island and two pixel clock cycles of trailing guard band words as the last two words of each data island), a video preamble (e.g. subsystem 108 inserts video preamble words after each data island), and video guard bands (e.g., subsystem 108 inserts two pixel clock cycles of video guard band words after each video preamble).

In response to a control signal indicative of DE (the DE signal received at interface 107), multiplexer 118 of transmitter 100 passes either video data from subsystem 106 (when DE is high) or the output of subsystem 108 (when DE is low) to TMDS core processor 114.

Core processor 114 operates in response to the stabilized pixel clock (generated by PLL 116) and performs the operations of encoding 8-bit data words as 10-bit TMDS code words, serializing the data, and transmitting the serialized encoded data (and the stabilized pixel clock) over a TMDS link to receiver 200 of FIG. 7 (an embodiment of the inventive receiver).

As shown in FIG. 7, receiver 200 includes core processor 214 which in operation is coupled to the TMDS link. Processor 214 recovers the pixel clock from the link's clock channel and main PLL 216 generates a stabilized pixel clock in response to the recovered pixel clock. In response to the stabilized recovered pixel clock, processor 214 performs the operations of de-serializing the data received over the link, decoding the de-serialized 10-bit TMDS code words to recover 8-bit code words, and asserting the 8-bit code words to splitting unit 218.

Unit 218 also receives a signal indicative of DE, and the stabilized recovered pixel clock, from processor 214. Unit 218 detects the beginning and end of each data island and each active video period in the code word stream from processor 214 (including by identifying guard bands and preamble code words), routes each audio data packet of each data island to pipelined audio subsystem 208, and routes the remaining data (including all bursts of video data) to pipelined video subsystem 206. In some operating modes, the data asserted by unit 218 to subsystem 206 includes HSYNC and VSYNC code words.

Video subsystem 206 of receiver 200 performs decryption and other processing (e.g., reformatting, upsampling or subsampling, and/or color space conversion) on the video data received from unit 218. Subsystem 206 decrypts the video data from unit 218 (to generate 8-bit decrypted words) using pseudo-random values from cipher engine 204 and asserts the decrypted video to the pipelined circuitry for performing other processing (e.g., reformatting, subsampling, and color space conversion) thereon. The latter circuitry outputs the decrypted, processed video bits Q[23:0], typically after final reformatting, and with corresponding DE, HSYNC, and VSYNC signals and a pixel clock. Optionally, subsystem 206 also includes a digital-to-analog converter that generates and outputs analog video signals (AnRPr, AnGY, and AnBPb), which can be red, green, and blue color component signals or luminance and chrominance signals, in response to 8-bit decrypted and processed video words. During operation, cipher engine 204 uses bits in registers 203. Registers 203 can be loaded with values received via interface 202 (from EEPROM 44) and/or via interface 201.

Where receiver 200 is implemented as an integrated circuit, EEPROM 44 (preloaded with a normal key set, and optionally also a test key set and test data) is can be implemented as a separate chip in a secure multi-chip module ("MCM") that includes both receiver 200 and EEPROM 44. Interface 202 provides the interface between receiver 200 and EEPROM 44. Interface 202 can retrieve values from EEPROM 44 at appropriate times, such as during an HDCP authentication exchange with transmitter 100. Interface 202 preferably uses the output of ring oscillator 213 (or another oscillator) to generate a clock (e.g., a 100 KHz clock) for use for I2C communication with EEPROM 44.

Interface 202, coupled to cache memory 204A (which is a random-access memory) is configured to cache in memory 204A a portion of the normal key set read from EEPROM 44 for use in performing an authentication exchange. Interface 202 can then retrieve the key data cached in memory 204A for use in performing at least one subsequent authentication exchange, thus eliminating the need to retrieve such key data from EEPROM 44 again. Interface 202 is also configured to cache in memory 204A at least one authentication value generated (using at least one key of the normal key set read from EEPROM 44) during an authentication exchange. Interface 202 can then retrieve the authentication value cached in memory 204A for use in performing at least one subsequent authentication exchange, thus eliminating the need to again retrieve the key data that was used to generate the authentication value from EEPROM 44.

For example, when receiver 200 that implements a modified HDCP protocol that closely resembles the conventional HDCP protocol but differs therefrom in minor respects, to accomplish decryption of audio data transmitted from transmitter 100 between active video periods as well as decryption of video data transmitted from transmitter 100, interface 202 reads the entire normal key set from EEPROM 44 during an initial authentication exchange, cipher engine 204 employs the key set (with a key selection vector received from transmitter 100) to generate a shared value ("Km"), and the shared value is then cached in memory 204A via interface 202. The key selection vector received from transmitter 100 (the transmitter KSV) and receiver 200's own key selection vector (the receiver KSV) are also cached in memory 204A. In a subsequent authentication exchange, receiver 200 checks whether the newly received "transmitter KSV" matches the cached "transmitter KSV" before retrieving any key data from EEPROM 44. If the new transmitter KSV matches the cached transmitter KSV, receiver 200 sends the cached "receiver KSV" to transmitter 100 (rather than retrieving a KSV from EEPROM 44) and uses the cached "Km" value to perform the rest of the exchange (rather than retrieving key data from EEPROM 44 to generate a new "Km" value). If the new transmitter KSV does not match the cached transmitter KSV, receiver 200 sends the cached receiver KSV to transmitter 100 and retrieves key data from EEPROM 44 to use (with the newly received transmitter KSV) to generate a new "Km" value. Typically, the transmitter KSV will change only very rarely during a sequence of authentication exchanges between a transmitter and receiver and thus the inventive caching technique typically reduces the average time required to perform each authentication exchange in the sequence. Cache memory 204A can typically be very small since each KSV employed in the conventional HDCP protocol (and typical modified versions of the HDCP protocol) consists of only 5 bytes, and each "Km" value employed in the conventional HDCP protocol (and typical modified versions of the HDCP protocol) consists of only 7 bytes.

Cache memory 204A is smaller than would be required to cache the entire key set conventionally employed during each authentication exchange. The use of at least one cached key and/or at least one cached authentication value allows at least one authentication exchange (occurring after the caching) to be performed more rapidly than it could be performed conventionally without caching.

Interface 201 can be coupled to the DDC channel of the TMDS link, and can implement an I2C slave protocol to communicate with transmitter 100 over the DDC channel (for example, to perform HDCP authentication including by loading key values received from the transmitter over the DDC channel into registers 203.

Optionally, when receiver 200 is a repeater (configured to operate as a transmitter that sends data to another receiver, in addition to being configured to receive data from transmitter 100), receiver 200 includes interface 207. Interface 207 can be coupled to a host device and can implement an I2C slave protocol to receive information and configuration bits and load such bits into registers 205 and 203. When appropriate (i.e., in response to predetermined status, information, or error conditions), interrupts ("INT") are asserted from registers 205 to a host device to request software attention.

Receiver 200 also includes pipelined audio subsystem 208 which receives and processes packets of audio data (or other auxiliary data) from unit 218. Subsystem 208 decodes words in the packets, decrypts decoded audio samples (using pseudo-random bits from cipher engine 204), performs error correction on the decrypted, decoded samples, unpacks the error-corrected, decrypted, decoded samples from the packets (and routes configuration and status bits that are unpacked from the packets to appropriate registers), and performs other processing on the unpacked audio samples (for example, by organizing the audio data for S/PDIF and I²S output engines and then processing the organized data in one or both of such engines to generate output data in one or both of S/PDIF or I²S format). Typically, subsystem 208 can output audio data in any of a number of different formats (e.g., as 2-channel uncompressed PCM data or as a compressed bitstream indicative of multi-channel data). In different operating modes, subsystem 208 asserts (with the output audio data) one or more of a bit clock ("SCK") whose frequency is the audio bit rate, an audio reference clock ("MCLK") which is a recovered version of the MCLK clock employed by transmitter 100, a serial data output clock (SDO) for use in demultiplexing a time-division multiplexed output audio data stream indicative of two audio channels, and a word select clock ("WS").

Main PLL 216 of receiver 200 generates a stabilized version of the pixel clock recovered from the clock channel of the TMDS link, for use by interface 214 and other elements of receiver 200.

Reset circuitry 212 of receiver 200 is coupled to a reset pin for receiving a reset bit from an external processor. Receiver 200 is configured to reset itself to an initial state in response to a predetermined value of the reset bit. Test circuitry 210 is coupled to a test pin for receiving a test mode bit from an external source. Receiver 200 is configured to operate in either a test mode or a normal operating mode depending on the value of the test mode bit.

Typically, each transmitter or receiver that embodies the invention is manufactured to meet a detailed specification. Preferably, each transmitter and receiver is manufactured in such a manner that it can be tested efficiently for compliance with the specification.

Preferably, each of receiver 200 and transmitter 100 is implemented to support a robust set of test features, enabled through the assertion of a test pin (the pin to which test circuit 110 is coupled in FIG. 6, or to which test circuit 210 is coupled in FIG. 7). Individual test modes can be selected through input-capable pins that are redesignated as test modifier pins during test mode operation, or through register bits. Alternatively, test mode enabling is accomplished by loading bits into registers (e.g., registers 205 of receiver 200 of FIG. 7, or registers 105 of transmitter 100 of FIG. 6), for example via an I2C interface (such as interface 207 of FIG. 7 or interface 101 of FIG. 6). While test mode enabling via the loading of register bits requires a larger set of vectors to enable a test mode, it can allow the transmitter or receiver to be designed with fewer input pins. An 8-bit test mode register would allow 64 different test modes.

Preferably, the test modes include a logic test (e.g., a full scan), an EEPROM test (e.g., a checksum BIST), a content protection function test (e.g., a test of HDCP circuitry, or other circuitry that implements an encryption and/or decryption function), a TMDS Core test (e.g., in which core 114 or 214 is isolated and then tested), a DAC test (e.g., in which the receiver DAC circuitry is isolated and then tested using test patterns), a PLL test, a ring oscillator test, and one or more debug tests (e.g., in which internal signals are multiplexed to input/output pins).

Typically a full scan logic test would require dedicated input and output pins, which are configured as test pins during logic test mode operation. Typically, a checksum-based BIST method is implemented to test an external EEPROM that stores key data (e.g., EEPROM 34 or EEPROM 44). Upon being enabled, test circuitry would read the contents of the relevant EEPROM, perform a checksum calculation, and then compare with a checksum read from the EEPROM. Preferably, only a simple Pass/Fail indicator is asserted by the test circuitry, to maintain security.

Transmitter 100 and EEPROM 34 (or receiver 200 and EEPROM 44) can be implemented as a multi-chip module ("MCM"), in which the EEPROM (which stores a normal key set and optionally also test data and/or a full or partial test key set) is implemented as one chip, the other circuitry is implemented as at least one other chip. The chips of an MCM can be entirely separate, or can be bonded together and included in a single package.

Alternatively, a transmitter or receiver can be implemented as an MCM including two chips of which one is an EEPROM chip, with a normal key set stored in the EEPROM chip and a full or partial test key set (and/or test data) stored in the second chip. In this case, even when the memory interface between the two chips is slow, the test key data and/or test data can be accessed rapidly from memory on the second chip (e.g., from RAM 104A or 204A as mentioned above) for use in test operations which would not be feasible if the test key set could only be accessed more slowly from a separate chip.

In variations on any embodiment described herein (including any embodiment implemented as an MCM), at least one key set (and/or test data) is stored in at least one PROM, where at least one such PROM is not an EEPROM.

In some embodiments, transmitter 100 and EEPROM 34 (or receiver 200 and EEPROM 44) are implemented as an MCM in which the EEPROM chip has selectable host micro-accessible regions (e.g., regions accessible by a host device during test mode operation, for example to read test results or configure the transmitter or receiver for testing), and also non-host accessible regions (that can be used, for example, to securely store a key set used for encryption or decryption). The non-host accessible regions of such an integrated circuit implementation of the EEPROM can store an HDCP key set and/or other key data (and optionally also other data) that are accessible only by the integrated circuit implementation of transmitter 100 (or receiver 200) and not by any other device.

Figure 8:
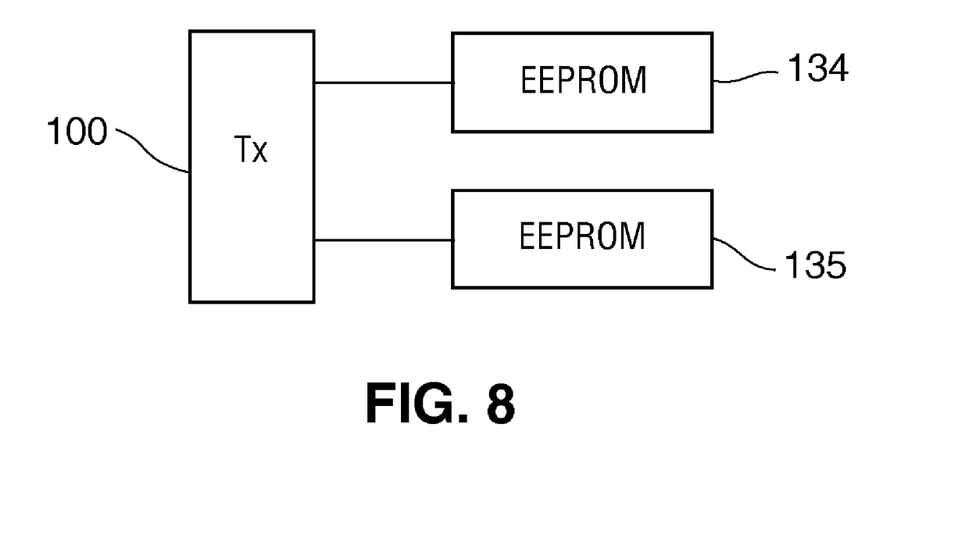
FIG. 8 is a block diagram of a transmitter and two non-volatile memories that embody the invention.
Figure 9:
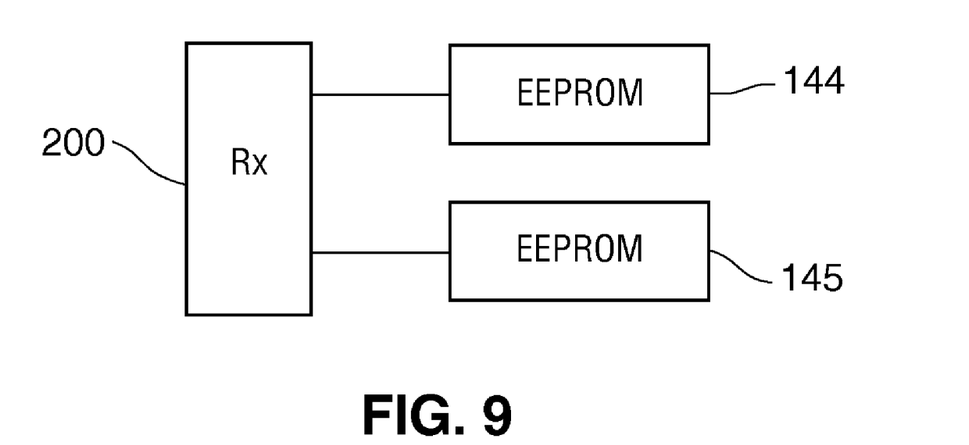
FIG. 9 is a block diagram of a receiver and two non-volatile memories that embody the invention.

In some variations on the FIG. 6 embodiment, such as that shown in FIG. 8, EEPROM 34 is replaced by EEPROM 134 (in which a normal key set is securely stored) and EEPROM 135 (in which one or both of a full or partial test key set, and test data are stored). Transmitter 100, EEPROM 134, and EEPROM 135 can be implemented as a multi-chip module ("MCM"), with each of transmitter 100, EEPROM 134, and EEPROM 135 implemented as a separate chip of the MCM. Similarly, in some variations on the FIG. 7 embodiment, such as that shown in FIG. 9, EEPROM 44 is replaced by EEPROM 144 (in which a normal key set is securely stored) and EEPROM 145 (in which one or both of a full or partial test key set, and test data are stored). Receiver 200, EEPROM 144, and EEPROM 145 can be implemented as an MCM, with each of receiver 200, EEPROM 144, and EEPROM 145 implemented as a separate chip of the MCM. In variations on the FIG. 8 and FIG. 9 embodiments (and in other embodiments of the invention), each of at least one EEPROM (for storing one or more of a normal key set, a full or partial test key set, and test data) is replaced by a ROM that is not an EEPROM.

Other embodiments do not employ an external EEPROM (an EEPROM external to an integrated circuit implementation of a transmitter, receiver, or other cryptographic device) for storing one or more of a normal key set, a full or partial test key set, and test data. Instead, they store a normal key set, full or partial test key set, and/or test data in at least one memory (which can be, but is not necessarily, an EEPROM) internal to the cryptographic device.

In another class of embodiments, the invention is a communication system including a transmitter, a receiver, and a link between the transmitter and receiver, in which at least one of the transmitter and receiver is an embodiment of the inventive cryptographic device. The system is configured to transmit at least one stream of encoded, encrypted data over the link from the transmitter to the receiver. In preferred embodiments, the link is a TMDS, TMDS-like, or other serial link.

In some embodiments, the inventive transmitter (or receiver) is a DVI-compliant or HDMI-compliant device, and the inventive system is a DVI-compliant or HDMI-compliant system.

It should be understood that while some embodiments of the present invention are illustrated and described herein, the invention is defined by the claims and is not to be limited to the specific embodiments described and shown.

What is claimed is:

1. A method for performing a self test of a cryptographic device, wherein a first key set and test data are stored in the device, the test data include authentication test data indicative of at least one result of at least one predetermined operation on a test key set, the authentication test data consist of fewer bits than the test key set, and the device is operable in a normal mode to perform at least one of encryption and decryption on input data using the first key set, said method including the steps of:
   (a) upon initiation of the self test, selecting the test data rather than the first key set;
   (b) performing an abbreviated authentication procedure using the authentication test data, wherein the abbreviated authentication procedure is an abbreviated version of a full authentication procedure that can be performed on the test key set, and the abbreviated authentication procedure on the authentication test data produces a result identical to a result of the full authentication procedure on the test key set; and
   (c) comparing at least one result of the authentication procedure to at least one expected result determined by the test data, and setting a flag indicative of the result of the comparison.

2. The method of claim 1, wherein step (b) also includes the step of performing one of encryption and decryption on a block of the test data.

3. The method of claim 1, wherein the predetermined operation is an HDCP authentication exchange, and the authentication test data are indicative of an HDCP shared value, Km.

4. The method of claim 1, wherein a subset of the test key set is also stored in the device, and wherein step (a) includes the step of selecting the subset of the test key set, and wherein step (b) includes the step of performing the abbreviated authentication procedure using at least some of the test data and the subset of the test key set.

5. The method of claim 4, wherein the predetermined operation is an HDCP authentication exchange, the authentication test data are indicative of an HDCP shared value, Km, and the subset of the test key set includes a key selection vector.

6. A method for performing a self test of a cryptographic device, wherein a first key set and test data are stored in the device, the test data include authentication test data indicative of at least one result of at least one predetermined operation on a test key set, the authentication test data consist of fewer bits than the test key set, and the device is operable in a normal mode to perform at least one of encryption and decryption on input data using the first key set, said method including the steps of:
 (a) upon initiation of the self test, selecting the test data rather than the first key set;
 (b) performing an abbreviated authentication procedure using the authentication test data, and performing one of encryption and decryption on a block of data, wherein the abbreviated authentication procedure is an abbreviated version of a full authentication procedure that can be performed on the test key set, and the abbreviated authentication procedure on the authentication test data produces a result identical to a result of the full authentication procedure on the test key set; and
 (c) comparing at least one result of an operation performed in step (b) to at least one expected result indicated by the test data, and setting a flag indicative of the result of the comparison.

7. The method of claim 6, wherein step (c) includes the step of comparing at least one result of the abbreviated authentication procedure to at least one expected authorization procedure result determined by the test data.

8. The method of claim 6, wherein the predetermined operation is an HDCP authentication exchange, and the authentication test data are indicative of an HDCP shared value, Km.

* * * * *